(12) United States Patent
Rosendahl

(10) Patent No.: US 9,738,165 B2
(45) Date of Patent: *Aug. 22, 2017

(54) CONTROLLING POWER SUPPLY TO VEHICLES THROUGH A SERIES OF ELECTRICAL OUTLETS

(76) Inventor: Glenn Rosendahl, Elie (CA)

( * ) Notice: Subject to any disclaimer, the term of this patent is extended or adjusted under 35 U.S.C. 154(b) by 1826 days.

This patent is subject to a terminal disclaimer.

(21) Appl. No.: 12/705,302

(22) Filed: Feb. 12, 2010

(65) Prior Publication Data

US 2011/0202213 A1 Aug. 18, 2011

(51) Int. Cl.
*G06F 17/00* (2006.01)
*B60L 11/18* (2006.01)

(52) U.S. Cl.
CPC ....... *B60L 11/1816* (2013.01); *B60L 11/1838* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
USPC ......................................................... 320/109
See application file for complete search history.

(56) References Cited

U.S. PATENT DOCUMENTS

| | | | | |
|---|---|---|---|---|
| 4,532,418 A | * | 7/1985 | Meese ................. | B60L 11/1816 194/904 |
| 5,521,838 A | * | 5/1996 | Rosendahl ................. | H02J 3/14 307/35 |
| 5,563,491 A | * | 10/1996 | Tseng .................. | B60L 11/1816 194/904 |
| 5,903,064 A | * | 5/1999 | Norberg ..................... | B60L 1/08 235/382 |
| 6,614,214 B2 | * | 9/2003 | Mizuhara ............. | G01R 13/347 324/76.15 |
| 6,828,755 B1 | * | 12/2004 | Iverson .................. | H01M 16/00 320/104 |
| 7,394,403 B2 | * | 7/2008 | Winkler ................. | G08G 1/127 340/990 |

(Continued)

FOREIGN PATENT DOCUMENTS

| | | | |
|---|---|---|---|
| JP | 2009-033265 | * | 2/2009 |
| JP | 2009033265 A | * | 2/2009 |

(Continued)

*Primary Examiner* — Jean-Paul Cass
(74) *Attorney, Agent, or Firm* — Adrian D. Battison; Ade & Company Inc

(57) ABSTRACT

A system for supplying electrical power to a plurality of vehicles from a central power supply through a plurality of electrical outlets includes an outlet control unit for each of the outlets and a vehicle control unit for each of the vehicles. The outlet microprocessor switches the supply of power to the outlet to communicate data to the vehicle. The vehicle microprocessor communicates data by switching a load across the power supply to provide interaction between the microprocessors to manage requirement and availability of power. The data includes whether the power plant of the vehicle is gasoline powered, diesel powered, hybrid or electric battery powered. The microprocessor of the vehicle control unit is arranged to control switches which supply power to selected loads in the vehicle and includes an interface which is arranged to connect to a Canbus communication system of the vehicle.

1 Claim, 5 Drawing Sheets

(56) References Cited

U.S. PATENT DOCUMENTS

| | | | | |
|---|---|---|---|---|
| 7,642,670 | B2* | 1/2010 | Rosendahl | B60L 3/0069 |
| | | | | 307/10.1 |
| 8,265,776 | B2* | 9/2012 | Osann, Jr. | G05B 15/02 |
| | | | | 340/637 |
| 8,350,527 | B2* | 1/2013 | Ichikawa | B60L 11/1816 |
| | | | | 320/104 |
| 8,355,832 | B2* | 1/2013 | Rosendahl | B60L 1/04 |
| | | | | 307/10.1 |
| 2001/0034557 | A1* | 10/2001 | Hudson | G05B 19/0421 |
| | | | | 700/3 |
| 2005/0231355 | A1* | 10/2005 | Hair, III | H04B 3/54 |
| | | | | 340/538 |
| 2009/0045676 | A1* | 2/2009 | Rosendahl | B60L 3/0069 |
| | | | | 307/31 |
| 2010/0106351 | A1* | 4/2010 | Hanssen | B60K 6/48 |
| | | | | 701/22 |
| 2011/0140835 | A1* | 6/2011 | Ishibashi | B60L 11/1824 |
| | | | | 340/5.2 |
| 2011/0202213 | A1* | 8/2011 | Rosendahl | B60L 11/1816 |
| | | | | 701/22 |
| 2011/0202214 | A1* | 8/2011 | Rosendahl | B60L 1/04 |
| | | | | 701/22 |
| 2012/0014745 | A1* | 1/2012 | Rosendahl | F16B 5/0635 |
| | | | | 403/315 |

FOREIGN PATENT DOCUMENTS

| | | | |
|---|---|---|---|
| JP | 2009-213301 | * | 9/2009 |
| JP | 2009213301 A | * | 9/2009 |

* cited by examiner

CONTROLLING POWER SUPPLY TO VEHICLES THROUGH A SERIES OF ELECTRICAL OUTLETS

This invention relates to an apparatus for supplying electrical power to a number of vehicles through separate electrical outlets.

BACKGROUND OF THE INVENTION

In colder regions of the globe electrical devices are used to heat automobile engines and interiors to facilitate engine starting and user comfort. Energy costs and conservation efforts have led to the widespread use of parking lot controls. These controls are designed to reduce energy consumption while still satisfying engine starting and user comfort constraints. Numerous algorithms have been devised to limit this consumption, ranging from simple timers to the most current proportional temperature controls (the colder it gets the more power is delivered).

Current parking lot controls are centralized, whereby all the loads of a parking lot are switched together on or off by a central contactor. Many inherent restrictions and limitations are imposed by this form of centralized control. Central contactor controls carry substantial installation and maintenance costs, with typical installation pay back periods in the order of five years or more. The longevity of mechanical contactors depend heavily on regular maintenance adding to operational costs.

Many lots impose a limit on power use for each vehicle. But since no adequate means of enforcement exists, it is left open to abuse. Often enough users abuse the set limits to trip the main breaker for a lot, inconveniencing all patrons. In addition, individual parking stall breakers are tripped due to temporary short circuits, overloads, etc. Since no feedback as to the presence of power is provided for users or maintenance personnel, this stall maybe without power for several days.

U.S. Pat. No. 5,521,838 by the present inventor issued May 28, 1996 discloses an apparatus for controlling and monitoring electrical automobile heating loads for the purpose of energy conservation. By fitting each outlet box (which controls two stalls) of a parking lot with a reprogramable microcontroller greater flexibility is realized. One novel feature included is the ability to detect each load as it is asserted or removed. This enables the device to delay delivery of power to a newly asserted load for sometime. By including apparatus for sensing current being delivered to each load another dimension in control is added. This enables the effective enforcement of power consumption limits for each vehicle, assisting in local demand power management. Maintenance costs are reduced and user service is increased by the detection of overloads or short circuits. Enabling these loads to be switched "off" before the associated breaker can trip. Added safety is provided by helping to prevent faulty loads from starting fires or damaging property. This apparatus enables the use of economical solid-state contactors for delivering power to attached loads, reducing maintenance costs and boosting reliability.

Feedback to patrons is provided by visual or auditory apparatus. In the case of visual feedback two light emitting diodes (LED's) are provided, one green the other red for each stall. As an example, when a user asserts a load the presence of power is identified by a quick flash of the green LED (load within acceptable limits) or the red LED is lit solidly (overload is rejected). For auditory feedback different tones identify load acceptance or rejection and the presence of power.

A bi-directional infrared data communication interface for communication with service personnel. From time to time general maintenance of parking lots are performed requiring power tools. To facilitate this whole parking lots are disabled with centralized controls. While with the present invention only required individual outlets need be disabled. With this data link operational modes and limits can be easily set and changed. Since this link is bi-directional the device can be used to collect operational data to be down loaded periodically at request.

An interface is provided to allow the microcontrollers program or firmware to be changed, making it field programmable. This increases the useful life and reduces manufacture costs. Useful life is increased by the fact the energy conservation algorithms can be kept up to date and customized to a particular application. Manufacturing costs are reduced by having to produce only one generic model. And by reprogramming the devices with self test and calibration routines, manufacture costs are further reduced.

U.S. Pat. No. 5,903,064 Norberg issued May 11, 1999 discloses communication from a vehicle mounted control unit to the an outlet control unit using signals communicated through the power cord and through the distribution network between the outlets to a central unit at a central power source. The communication is used to allow an alarm function on disconnection, authorization of use and billing. The outlet control unit can also detect state of charging. The system is connected using a series arrangement.

U.S. Pat. No. 4,532,418 Meese issued Jul. 30, 1985 discloses a combined battery charging system and parking meter for vehicles which allows billing using a charge card system.

U.S. Pat. No. 6,614,214 Pelegrino issued Sep. 2, 2003 discloses a battery charging system for vehicles which allows billing using an optical reader.

U.S. Pat. No. 5,563,491 Tseng issued Oct. 8, 1996 discloses a combined battery charging system and parking meter which allows billing using a radio transmitter system.

SUMMARY OF THE INVENTION

It is one object of the invention to provide an improved system of the above type.

According to a first aspect of the invention there is provided an apparatus for supplying electrical power to a vehicle from an electrical outlet to which the vehicle is brought and at which it remains stationary for a period during which the power is supplied through an electrical connection cable connected from the vehicle to the electrical outlet, the apparatus comprising:

an outlet control unit for mounting at the electrical outlet;
and a vehicle control unit for mounting in the vehicle;
the outlet control unit comprising:
at least one electrical outlet;
a microprocessor;
and a switch operable by the microprocessor for selectively supplying power from a central power supply to said at least one electrical outlet;
the vehicle control unit comprising:
an input cable for connection to the electrical outlet;
a power supply connection for supplying power from the outlet to one or more loads in the vehicle;
a microprocessor;

the microprocessor of the vehicle control unit being arranged to communicate data to the outlet control unit;

wherein the outlet control unit comprises a power supply system arranged to supply power at a plurality of different power supply characteristics including a plurality of different voltage values and including voltages with DC supply and AC supply;

wherein the switch is arranged to select from the different power supply characteristics;

and wherein the microprocessor of the vehicle control unit has a data storage containing data relating to the characteristics of the power required for the vehicle for communication to the outlet control unit.

Preferably the characteristics include a plurality of DC voltages at different voltage values.

Preferably the characteristics of the power are selected by the vehicle control unit so as to provide direct charging of a battery system without the necessity for voltage transforming or conversion between AC and DC at the vehicle.

Preferably the vehicle control unit includes a load connected by a switch so as to apply the load across the power supply from the outlet control unit and wherein the microprocessor of the vehicle control unit is arranged to operate the switch so as to communicate data along the cable to the outlet control unit.

According to a second aspect of the invention there is provided an apparatus for supplying electrical power to a vehicle from an electrical outlet to which the vehicle is brought and at which it remains stationary for a period during which the power is supplied through an electrical connection cable connected from the vehicle to the electrical outlet, the apparatus comprising:

an outlet control unit for mounting at the electrical outlet;
and a vehicle control unit for mounting in the vehicle;
the outlet control unit comprising:
at least one electrical outlet;
a microprocessor;
and a switch operable by the microprocessor for selectively supplying power from a central power supply to said at least one electrical outlet;
the vehicle control unit comprising:
an input cable for connection to the electrical outlet;
a power supply connection for supplying power from the outlet to one or more loads in the vehicle;
a microprocessor;
the microprocessor of the vehicle control unit being arranged to communicate data to the outlet control unit;
wherein the microprocessor of the vehicle control unit includes an interface which is arranged to connect to a Canbus communication system of the vehicle;
and wherein the outlet control unit and the vehicle control unit are arranged to communicate from a central source download data for the Canbus communication system.

Preferably the download data includes software upgrades.

Preferably the vehicle control unit includes a load connected by a switch so as to apply the load across the power supply from the outlet control unit and wherein the microprocessor of the vehicle control unit is arranged to operate the switch so as to communicate data along the cable to the outlet control unit. However other communication systems can be used.

According to a third aspect of the invention there is provided an apparatus for supplying electrical power to a vehicle from an electrical outlet to which the vehicle is brought and at which it remains stationary for a period during which the power is supplied through an electrical connection cable connected from the vehicle to the electrical outlet, the apparatus comprising:

an outlet control unit for mounting at the electrical outlet;
and a vehicle control unit for mounting in the vehicle;
the outlet control unit comprising:
at least one electrical outlet;
a microprocessor;
and a switch operable by the microprocessor for selectively supplying power from a central power supply to said at least one electrical outlet;
the vehicle control unit comprising:
an input cable for connection to the electrical outlet;
a power supply connection for supplying power from the outlet to one or more loads in the vehicle;
a microprocessor;
the microprocessor of the vehicle control unit being arranged to communicate data to the outlet control unit;
wherein the microprocessor of the vehicle control unit includes an interface which is arranged to connect to a Canbus communication system of the vehicle;
and wherein the vehicle control unit and the Canbus communication system are arranged to prevent driving motion of the vehicle while the input cable remains connected.

Preferably the vehicle control unit is arranged to detect the connection of the input cable and to provide to the Canbus communication system a signal locking against engagement of drive power to the vehicle.

Preferably the vehicle control unit includes a load connected by a switch so as to apply the load across the power supply from the outlet control unit and wherein the microprocessor of the vehicle control unit is arranged to operate the switch so as to communicate data along the cable to the outlet control unit.

According to a fourth aspect of the invention there is provided an apparatus for supplying electrical power to a vehicle from an electrical outlet to which the vehicle is brought and at which it remains stationary for a period during which the power is supplied through an electrical connection cable connected from the vehicle to the electrical outlet, the apparatus comprising:

an outlet control unit for mounting at the electrical outlet;
and a vehicle control unit for mounting in the vehicle;
the outlet control unit comprising:
at least one electrical outlet;
a microprocessor;
and a switch operable by the microprocessor for selectively supplying power from a central power supply to said at least one electrical outlet;
the vehicle control unit comprising:
an input cable for connection to the electrical outlet;
a power supply connection for supplying power from the outlet to one or more loads in the vehicle;
a microprocessor;
the microprocessor of the vehicle control unit being arranged to communicate data to the outlet control unit;
wherein the outlet control unit is arranged to receive and store data relating to the amount of total power received by the vehicle and to transmit that data to a remote location.

Preferably the outlet control unit is arranged to detect power transfer to the vehicle and to measure a time over which the power is supplied and to store data relating thereto.

Preferably the vehicle control unit is arranged to detect power transfer to the vehicle and to measure a time over which the power is supplied and to transmit data relating thereto to the vehicle control unit.

Preferably the vehicle control unit includes a load connected by a switch so as to apply the load across the power supply from the outlet control unit and wherein the microprocessor of the vehicle control unit is arranged to operate the switch so as to communicate data along the cable to the outlet control unit.

According to a fifth aspect of the invention there is provided an apparatus for supplying electrical power to a vehicle from an electrical outlet to which the vehicle is brought and at which it remains stationary for a period during which the power is supplied through an electrical connection cable connected from the vehicle to the electrical outlet, the apparatus comprising:

an outlet control unit for mounting at the electrical outlet;
and a vehicle control unit for mounting in the vehicle;
the outlet control unit comprising:
at least one electrical outlet;
a microprocessor;
and a switch operable by the microprocessor for selectively supplying power from a central power supply to said at least one electrical outlet;
the vehicle control unit comprising:
an input cable for connection to the electrical outlet;
a power supply connection for supplying power from the outlet to one or more loads in the vehicle;
a microprocessor;
the microprocessor of the vehicle control unit being arranged to communicate data to the outlet control unit;
wherein the outlet control unit is arranged to control supply of power to predetermined hours of supply which are outside of peak hours.

Preferably the outlet control unit includes a input allowing over-ride of the hours of supply.

Preferably the outlet control unit includes a input providing an indication of a next expected time of use of the vehicle and is arranged to select for the supply of power those hours which are best for supply efficiency.

Preferably the outlet control unit includes a input providing an indication of a next expected time of use of the vehicle and is arranged to receive from the vehicle control unit an indication of power requirement for the vehicle and is arranged to select from the requirement and the number of hours before next use for the supply of power those hours which are best for supply efficiency.

Preferably the hours are selected on the basis of least cost to the vehicle user.

Preferably the vehicle control unit includes a load connected by a switch so as to apply the load across the power supply from the outlet control unit and wherein the microprocessor of the vehicle control unit is arranged to operate the switch so as to communicate data along the cable to the outlet control unit.

According to a sixth aspect of the invention there is provided an apparatus for supplying electrical power to a device requiring power from an electrical outlet to which the device is brought and at which it remains stationary for a period during which the power is supplied through an electrical connection cable connected from the device to the electrical outlet, the apparatus comprising:

an outlet monitoring unit for mounting at the electrical outlet;
and a device communication unit for mounting in the device;
the outlet monitoring unit comprising:
a microprocessor;
and a sensor for monitoring current or power supplied by the electrical outlet to the device;
the device communication unit comprising:
an input cable for connection to the electrical outlet;
a microprocessor;
the microprocessor of the vehicle control unit being arranged to communicate data to the outlet control unit;
wherein the device communication unit includes a load connected by a switch so as to apply the load across the power supply from the electrical outlet and wherein the microprocessor of the device communication unit is arranged to operate the switch so as to communicate data along the cable to the outlet monitoring unit.

Preferably the outlet monitoring unit is a separate unit from the electrical outlet and is arranged to be connected by taps onto the conductors at the electrical outlet.

According to a seventh aspect of the invention there is provided an apparatus for supplying electrical power to a device requiring power from an electrical outlet to which the device is brought and at which it remains stationary for a period during which the power is supplied through an electrical connection cable connected from the device to the electrical outlet, the apparatus comprising:

an outlet control unit for mounting at the electrical outlet;
and a device control unit for mounting in the device;
the outlet control unit comprising:
at least one electrical outlet;
a microprocessor;
and a switch operable by the microprocessor for selectively supplying power from a central power supply to said at least one electrical outlet;
the device control unit comprising:
an input cable for connection to the electrical outlet;
a power supply connection for supplying power from the outlet to one or more loads in the device;
a microprocessor;
the microprocessor of the device control unit being arranged to communicate data to the outlet control unit;
wherein the device control unit includes a load connected by a switch so as to apply the load across the power supply from the electrical outlet and wherein the microprocessor of the device control unit is arranged to operate the switch so as to communicate data along the cable to the outlet control unit.

Preferably the outlet control unit is arranged to recognize an ID signal communicated from the device control unit and to allow power if approved.

Preferably the outlet control unit comprises a power supply system arranged to supply power at a plurality of different power supply characteristics, wherein the switch is arranged to select from the different power supply characteristics and wherein the microprocessor of the device control unit has a data storage containing data relating to the characteristics of the power required for the device for communication to the outlet control unit.

Preferably the power supply characteristics include a plurality of different voltage values and include voltages with DC supply and AC supply.

Preferably the characteristics include a plurality of DC voltages at different voltage values.

Preferably the characteristics of the power are selected by the outlet control unit so as to provide direct charging of a battery system without the necessity for voltage transforming or conversion between AC and DC at the device.

Preferably the outlet control unit is arranged to receive and store data relating to the amount of total power received by the vehicle and to transmit that data to a remote location.

Preferably the outlet control unit is arranged to detect power transfer to the device and to measure a time over which the power is supplied and to store data relating thereto.

Preferably the device control unit is arranged to detect power transfer to the device and to measure a time over which the power is supplied and to transmit data relating thereto to the device control unit.

Preferably the outlet control unit is arranged to control supply of power to predetermined hours of supply which are outside of peak hours.

Preferably the outlet control unit includes an input allowing over-ride of the hours of supply.

Preferably the outlet control unit includes an input providing an indication of a next expected time of use of the device and is arranged to select for the supply of power those hours which are best for supply efficiency.

Preferably the outlet control unit includes a input providing an indication of a next expected time of use of the device and is arranged to receive from the device control unit an indication of power requirement for the device and is arranged to select from the requirement and the number of hours before next use for the supply of power those hours which are best for supply efficiency.

Preferably the hours are selected on the basis of least cost to the device user.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The following description is taken from the above patent of the present inventor, the complete disclosure of which is incorporated herein by reference, to describe the context of the present invention.

Figure 1:
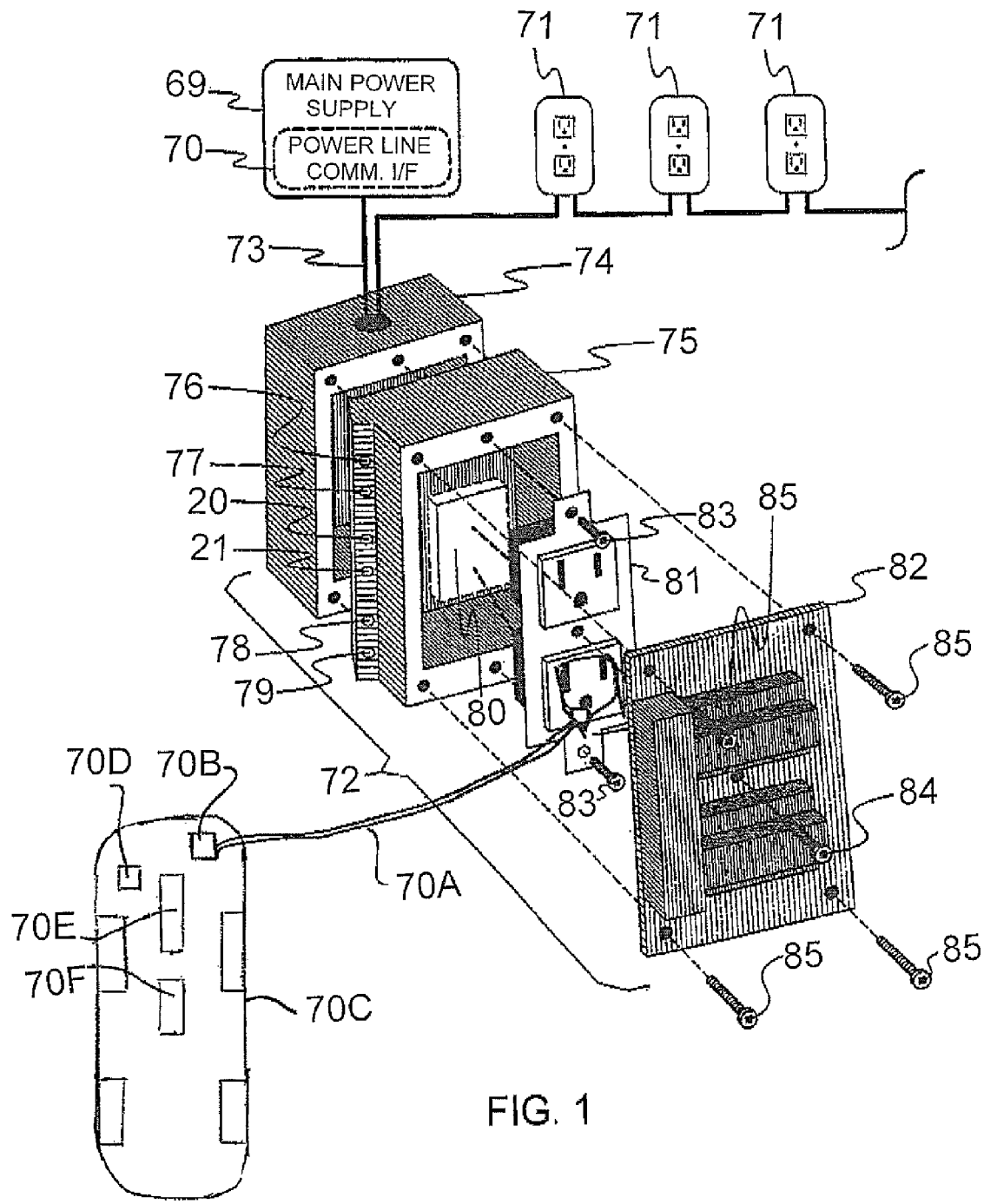
FIG. 1 is a schematic illustration of the system according to the present invention which is partly taken from FIG. 7 of the above patent of the present inventor.

In FIG. 1 is shown an overview of the whole system which includes a main power supply 69 for supplying electrical power to a plurality of outlets 71, most of which are shown only schematically but one of which indicated at 72 is shown in an exploded isometric view. The electrical power is supplied through wiring 73 which is again shown only schematically without distinguishing between the hot, neutral or ground wires.

The main power supply comprises basically only a main breaker and possibly a number of subsidiary breakers to a number of different circuits depending upon the number of outlets to be supplied.

It is a conventional practice to provide the outlet as paired outlets with each pair within a separate receptacle mounted at a spaced position around the car park to be supplied. The one outlet illustrated in detail therefore comprises a metal box or receptacle 74 which is mounted on a suitable support for example of wooden post, fencing or the like. The receptacle 74 has an open front face which can receive a rectangular extension box module 75 which in turn carries a standard duplex outlet 81 and cover plate 82. The extension box module is fastened in place by a conventional screw arrangement 85 which connects with screw holes supplied on the receptacle 75. The standard outlet 81 is fastened to the receptacle 74 through holes provided by the extension box module 75 in a standard arrangement by screws 83. The standard cover plate 82 is fastened by screws 85 and/or 84. A suitable gasket or other sealing arrangement can be provided to prevent moisture penetration but this is not illustrated as it is well known to one skilled in the art.

The extension box module 75 contains a control unit 80 which enables the independent control of each outlet of an attached duplex outlet 81. A conventional electrical terminal arrangement is provided on the rear face of the extension box module 75 so as to be insertable into the receptacle 74 for electrical supply connection, protection, and containment thereby. Wires are provided within the open front face of the extension box module 75 so as to enable the standard connection of a standard duplex outlet 81.

The control of the power supply to each outlet is effected by the control unit 80 contained within the extension box module 75, without the necessity for any central control intelligence. In this way the system can be implemented into existing receptacles and wiring simply by inserting the extension box module 75 between the conventional outlet 81 cover plate 82 and the supply receptacle 74. This allows installation at a relatively inexpensive price. In addition individual programming of the outlets can be provided.

On the side facing forward of the extension box module is also shown a first LED 76, 79 which is green for indicating normal or proper operation of the power supply after application of a load. A second LED indicated at 77, 78 is red and this is used to indicate an unacceptable load as described hereinafter. Further ports 20 and 21 are provided for bi-directional communication as again described hereinafter.

A power supply cord 70A connects power from the outlet 81 to a vehicle control unit 70B in a vehicle 70C for supplying power to a battery 70D and other components 70E and 70F in the vehicle.

Figure 2:
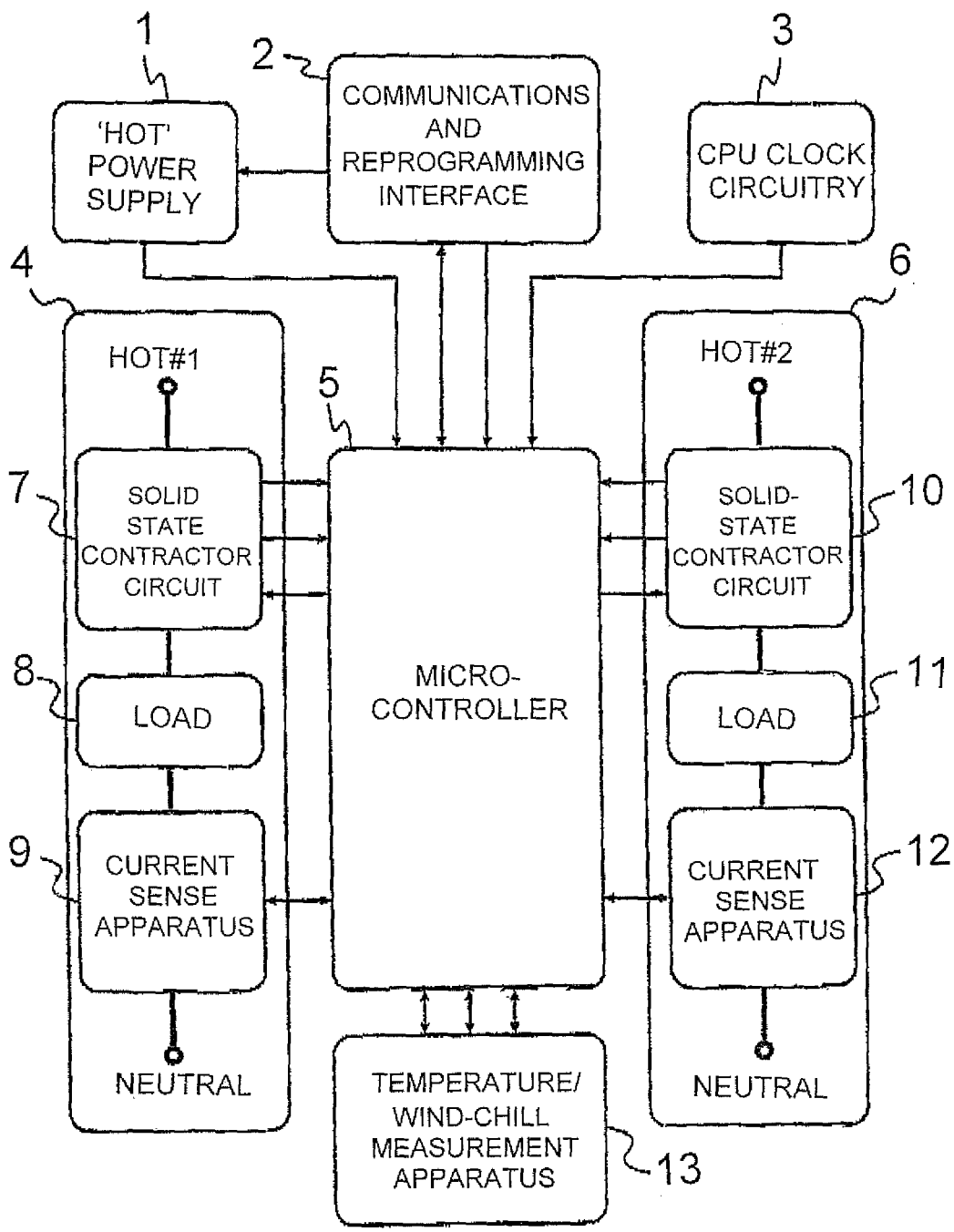
FIG. 2 is a schematic illustration of the outlet control unit of FIG. 1 which is taken from FIG. 1 of the above patent of the present inventor.

An overall block diagram of the outlet control unit is shown in FIG. 2. The "Hot" power supply 1 supplies all the required power for normal operation of the device. Communication and reprogramming features are supplied by the infrared communications and reprogramming interface 2. The system operation clock for the microcontroller 5 is provided by the CPU clock circuitry 3. The microcontroller controls both outlets of a dual outlet receptacle through the outlet interfaces 4 and 6. Each outlet interface is identical in construction composed of solid-state contactor circuits 7 and 10, a standard outlet where electrical loads may be attached 8 and 11 and current sense apparatus 9 and 12. The temperature/wind-chill measurement apparatus 13 enables the microcontroller 5 to measure the ambient temperature or wind-chill. Together these circuits provide a novel and particularly useful function for the purpose of energy conservation.

Figure 3:
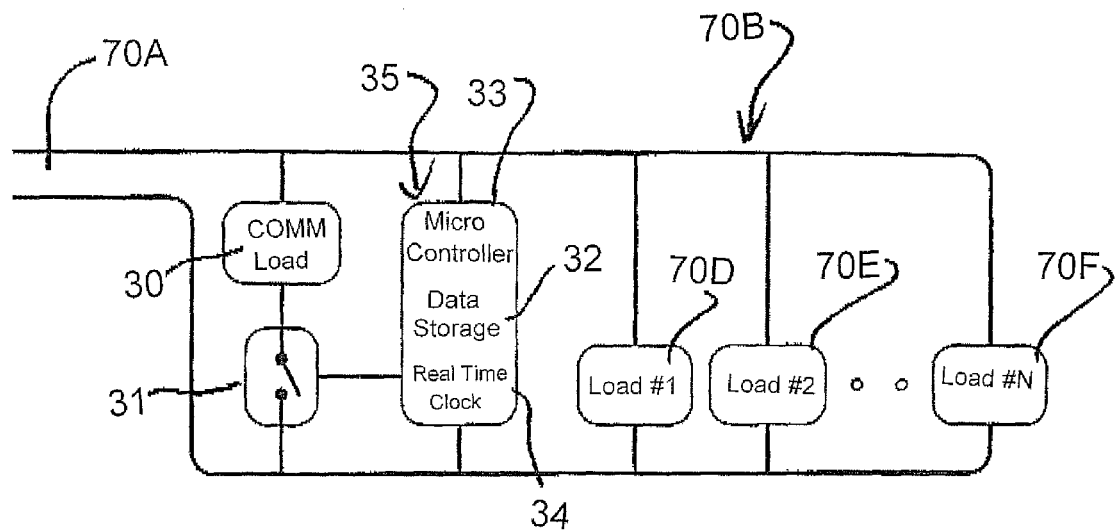
FIG. 3 is a schematic illustration of one embodiment of the vehicle control unit of FIG. 1.

In FIG. 3 is shown one implementation of the vehicle control unit 70B of FIG. 1 which consists of a combination of a communication load 30 and switch 31 connected across the conductors of the cable 70A to provide a load modulation mechanism for data communication to the outlet control unit of FIG. 1. A module 35 contains a Micro-controller 33, Data Storage 34, and Real Time Clock 36 which provides the information to communicate to the outlet control unit. The Data Storage holds information about the load or loads defined by the components 70D, 70E and 70F of the vehicle which are programmed by the user or operator of the vehicle through the microprocessor. This information can include the following 1. Identification of the type of vehicle (gasoline, diesel, hybrid, etc).
2. energy v temperature requirements,
3. what days and hours this vehicle is to be used or ready to be used,
4. what size the load should be,
5. and any other information that is deemed to be important to a load.

Any number of vehicle loads 70D, 70E and 70F are attached in parallel. This implementation does not include switches for each attached load to save on cost.

The AC power lines 70A from the extension cord enters on the left hand side into the circuit. The Micro-controller 33, Data storage 34, and Real Time Clock unit 35 controls the switch 31 of the COMM load 30. When this switch is closed; the COMM load is added to Loads 70D, 70E and 70F on the AC line. When this switch is open; the COMM load is not added to Loads on the AC line. By closing and opening this switch the load size presented to the AC line is modulated by the size of the COMM load. This signal is read by the outlet control unit of FIG. 2 by the microcontroller 5.

This information when communicated to the micro-controller 5 can be used to control the time of supply and the allowed current supplied to the vehicle to accommodate the expected loads. Thus it will be appreciated that a gasoline engine and the battery for a gasoline engine will have different temperature and power characteristics from a diesel engine and from a hybrid engine. It is well known that diesel engines require the engine to be heated to maintain the engine at temperatures above freezing to ensure starting whereas gasoline engines can tolerate a much lower temperature before starting difficulties arise. Hybrid engines and the batteries for them require different characteristics of power supply for charging the power batteries. Yet further electric motor powered vehicles have yet further different characteristics. All of these requirements can be stored in the micro-controller 5 and the characteristic communicated by the micro-controller 35 along the cable 70A by the switch 31 connecting and disconnecting the load 30.

Turning now to FIG. 3, this arrangement is similar to that if FIG. 2 with the addition of switches 37, 38 and 39 to the loads which are controlled by the microcontroller 35 and the provision of a CAN BUS interface connected to the microcontroller 35. The CAN BUS interface allows the micro-controller 35 to communicate with the control systems of the vehicle using the CAN BUS conventional communications protocol to exchange information therewith or to obtain data therefrom.

The Micro-controller 35 is connected to the AC power line 70A delivered by the outlet control unit. In this way the Micro-controller can sense when AC power is on and when it is off. The outlet control unit can therefore communicate to this Micro-controller by turning on and off the AC power forming a low baud rate bit stream. Power for the Micro-controller 35 can be derived from the AC power supply and/or a local battery.

The addition of a CAN BUS interface enables the Micro-controller to communicate with the vehicles onboard computer systems and sensors. With the addition of the switches 37, 28 and 39 to control N different loads various electrical systems on the vehicle maybe controlled. Using the information from the CAN BUS interface various loads can be included or excluded depending on their individual power requirements and depending on the power available. And in this way only electrical subsystems which require power are powered, increasing the potential power savings. It will be appreciated therefore that the power available on the system to the individual outlets will vary depending on the number of vehicles connected at any one time and on the total power required. The smart outlet control unit can therefore manage this available power in the best manner. At the same time, the power available to the individual vehicle will vary and the smart vehicle control unit can manage this power in the best manner by supplying it to the loads most requiring the power.

Communications between the two units of power available and power required will allow the system as a whole to be managed for best power savings and for best power management.

Figure 4:
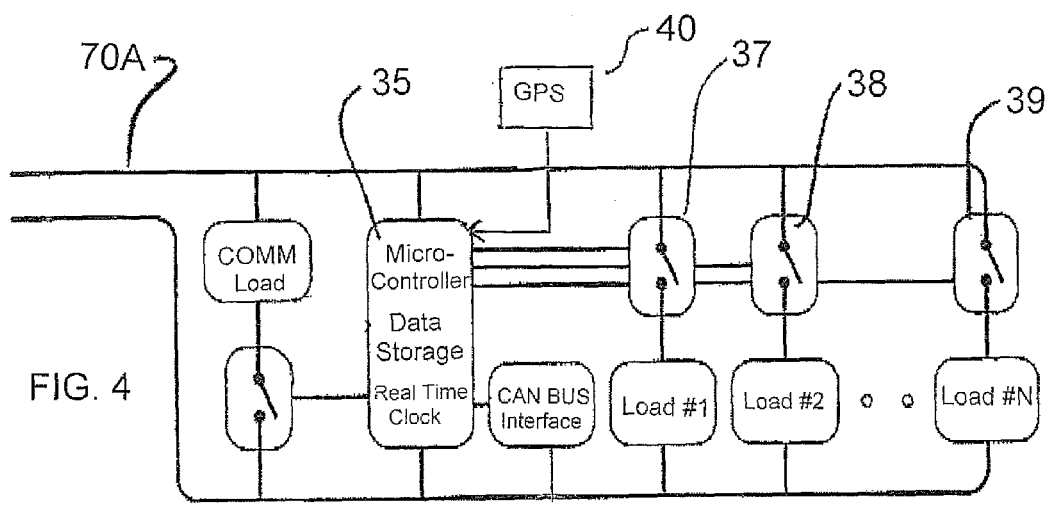
FIG. 4 is a schematic illustration of a second more complex embodiment of the vehicle control unit of FIG. 1.

The vehicle as shown in FIG. 4 includes a GPS receiving system 40 which communicates into the micro-controller 35. The GPS system can be used to generate records in the micro-controller 35 indicating information such as where and how far the vehicle travels between plug-in times. This information can be relayed via the vehicle control unit and the outlet control unit and can serve to update records at the central location relating to maintenance or scheduling, delivery route planning, abuse monitoring, etc. The real time clock 34 in the vehicle control unit and the time clock 3 in the outlet control unit can thus be set without user intervention using the GPS satellite system. Both the current time as well as time zone can be updated without user intervention using the GPS system as an input.

Figure 5:
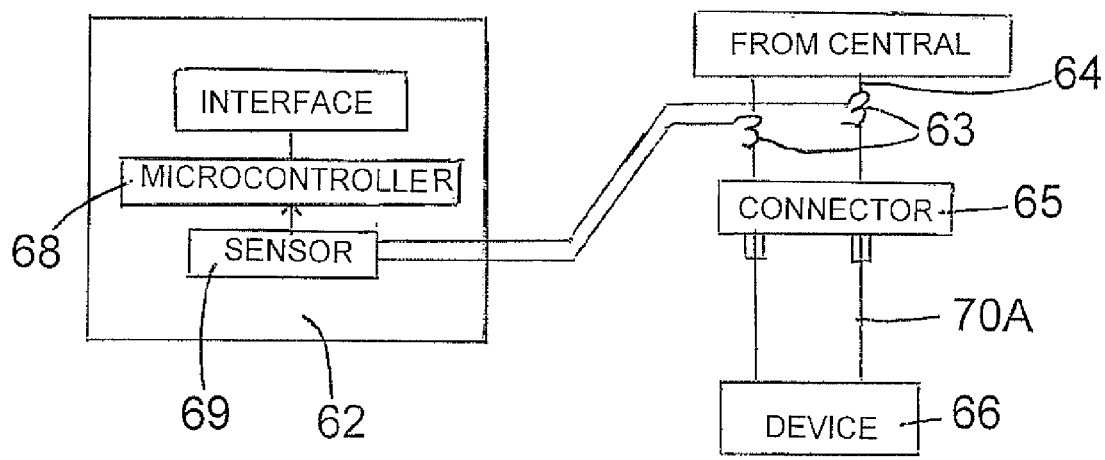
FIG. 5 is a schematic illustration of a modified version of the outlet control unit which provides enhanced features.

Turning now to FIG. 5, this shows a schematic illustration of a modified version of the outlet control unit which provides enhanced features. The unit illustrated includes all of the features previously described herein which will not be repeated here.

Thus the outlet control unit comprises a power supply system 50 arranged to supply power at a plurality of outputs 51, 52, 53, 54 having different power supply characteristics including a plurality of different voltage values and including voltages with DC supply and AC supply. A switch 55 is arranged to select from the different power outlets having the different supply characteristics for connection to the outlet cable 70A. Thus the characteristics of the power can be selected by the micro-processor 57 of the vehicle control unit so as to provide a suitable voltage for direct charging of a battery system without the necessity for voltage transforming or conversion between AC and DC at the vehicle. The characteristics of the power outputs include a plurality of DC voltages at different voltage values.

The microprocessor of the vehicle control unit in this embodiment can be of the same construction as in FIG. 3 or 4 but is modified to include in the data storage 35 data relating to the characteristics of the power required for the vehicle for communication to the outlet control unit.

As also shown in FIG. 5, the outlet control unit includes a current or power sensor 56 which communicates to the processor 57 which is therefore arranged to receive and store data relating to the amount of total power received by the vehicle through the power supply 50 and, if requested to transmit that data through an interface to a remote location or central processor 59.

Thus the outlet control unit is arranged to detect power transfer to the vehicle and to measure a time over which the power is supplied and to store data relating thereto.

In addition, the outlet control unit can be arranged to control supply of power to predetermined hours of supply which are outside of peak hours. This information can be supplied to the processor 57 from the central processor so as to provide data to allow the required selection. In one arrangement, the hours can be selected using a timer 61 on the basis of least cost to the vehicle user where the different hours available are given different cost factors by the supplier to allow the system to select the best for the user. It will of course be appreciated that electricity has very different costs or values at different hours of the day depending on peak usage so that the cost structure selected is set up to encourage off peak use.

Thus typically where there is no urgency for re-charging to be effected, the system can schedule this within the hours available to the best advantage of the supplier and user.

However the system also provides an arrangement by which the user can input information into a data input 60 the outlet control unit includes a input allowing over-ride of the hours of supply.

Thus for example, the outlet control unit allows an input providing an indication of a next expected time of use of the vehicle and is arranged to select for the supply of power those hours which are best for supply efficiency, bearing in mind the number of hours available.

Furthermore the outlet control unit can be arranged to receive from the vehicle control unit an indication of power requirement for the vehicle, for example the state of charge, and is arranged to select, from this together with the number of hours before next use for the supply of power, those hours which are best for supply efficiency while getting the required level of charge up to the desired amount before the vehicle is next used.

Figure 6:
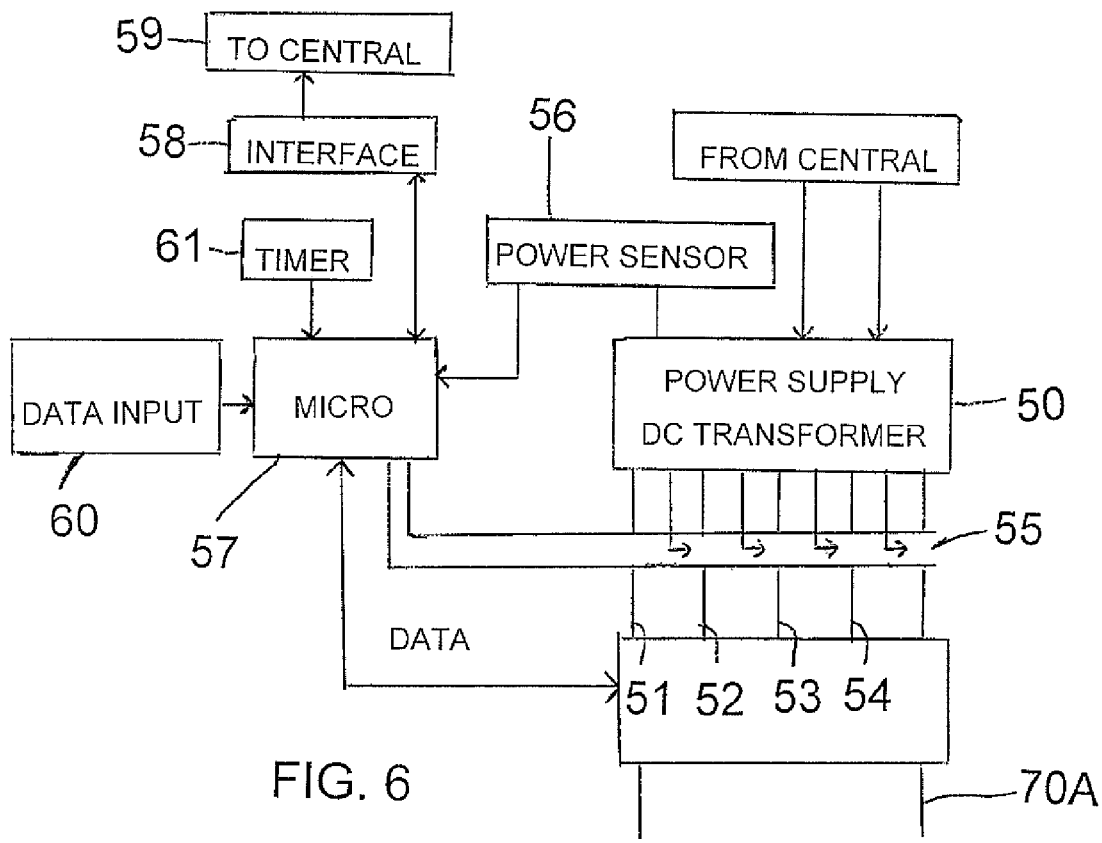
FIG. 6 is a schematic illustration of a modified version of an outlet monitoring unit which does not act as a switch but merely is connected by taps to monitor power to the vehicle or other device and to communicate between the monitoring unit and the device.

Turning now to FIG. 6 which is a schematic illustration of a modified version of an outlet monitoring unit 62, in this embodiment, the unit 62 does not act as a switch so that there is no switch between the power input 64 and the cable 70A, but merely is connected by taps 63 to monitor power to the vehicle or other device and to communicate between the monitoring unit and the device.

Thus the unit provides a system for supplying electrical power to a device such as a vehicle or any other device which requires power such as a lap top from an electrical outlet 65 to which the device 66 is brought and at which it remains stationary for a period during which the power is supplied through the electrical connection cable 70A connected from the device to the electrical outlet.

The unit thus includes a microprocessor 68 and a sensor 69 for monitoring current or power supplied by the electrical outlet to the device. The unit cooperates with the device which includes a communication unit also having a microprocessor arranged to communicate data to the outlet control unit 62 using the data communication system of the load and switch described above.

Thus in this case the outlet monitoring unit is a separate unit 62 from the electrical outlet 65 and is arranged to be connected by taps 63 onto the conductors at the electrical outlet.

Figure 7:
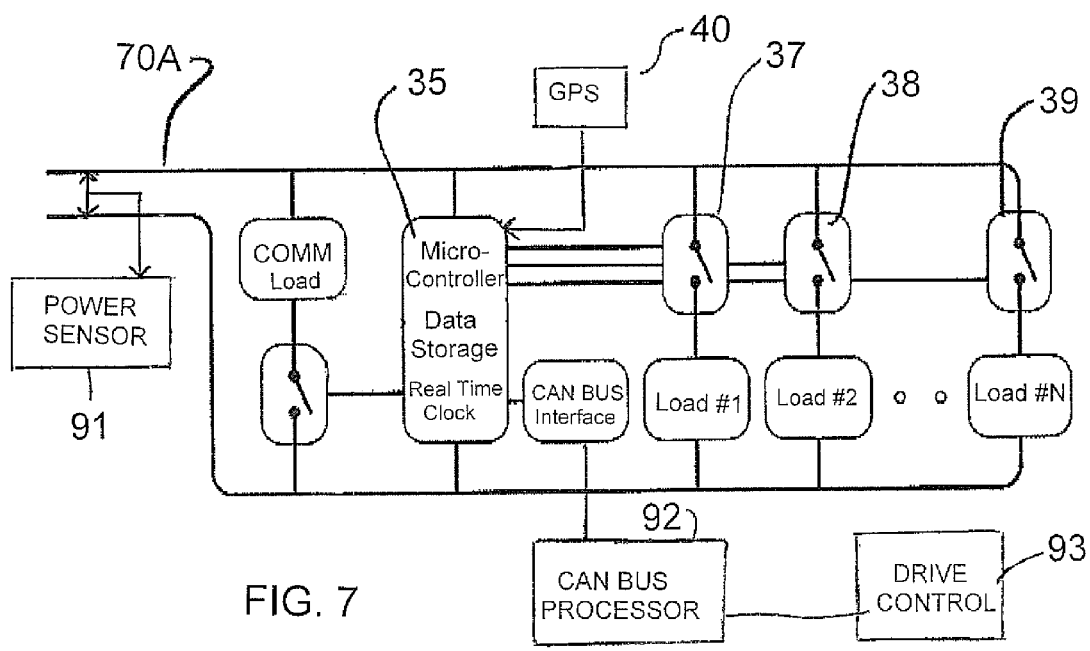
FIG. 7 is a schematic illustration of a modified version of the vehicle control unit which provides enhanced features.

As an alternative, as shown in FIG. 7 the vehicle control unit instead is arranged to detect by a sensor 91 power transfer to the vehicle and to measure a time over which the power is supplied and to transmit data relating thereto to the vehicle control unit. This is then communicated to the unit 62 by the data transfer mechanism described.

In FIG. 7 is a schematic illustration of a modified version of the vehicle control unit which provides enhanced features. Thus as previously described, the microprocessor of the vehicle control unit includes an interface which is arranged to connect to a Canbus communication system of the vehicle. In this arrangement, the outlet control unit and the vehicle control unit are arranged to communicate from the central source 59 download data for the Canbus communication system 92. The download data can include for example software upgrades or other data for the Canbus system such as repairs or recalls.

The vehicle control unit and the Canbus communication system are also arranged as shown in FIG. 7 to prevent driving motion of the vehicle while the input cable remains connected. Thus the vehicle control unit is arranged to detect the connection of the input cable by detecting the presence of power and to provide to the Canbus communication system a signal locking against engagement of drive power to the vehicle as indicated at drive control 93.

Figure 8:
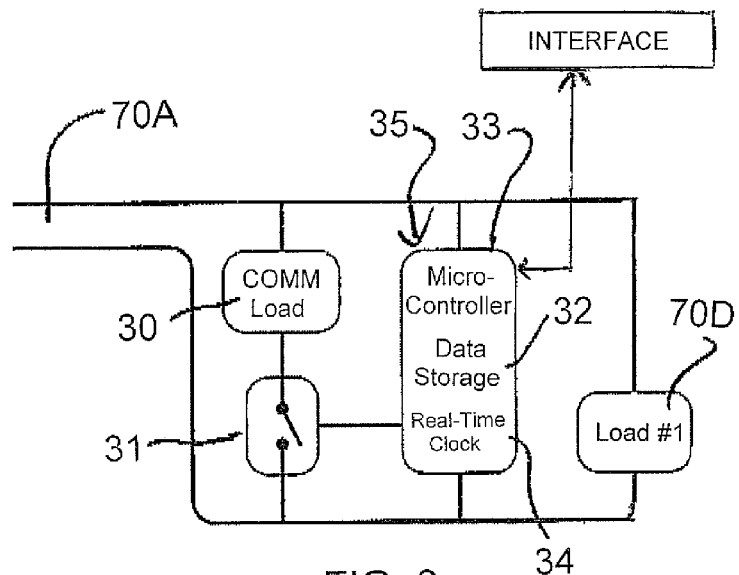
FIG. 8 is a schematic illustration of a modified version of the control unit which is of a simplified form so as to be useable on devices other than vehicles such as a lap top computer.

In FIG. 8 is shown a schematic illustration of a modified version of the control unit which is of a simplified form so as to be useable on devices other than vehicles such as a lap top computer. This arrangement is therefore simplified in that there is only a single load for the battery of the device. Also the device uses the laptop interface 95 to communicate authorization data from a central authorization authority such as a payment system to the processor 34 so that this can be used to communicate with the outlet control unit and obtain authorized power.

The system described above is designed primarily for electrically powered vehicles where the amount of power to be supplied is significant. However all of the features described above can be used for any other device and can be used in smart power management systems.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. Apparatus comprising:
a vehicle; and
the apparatus for supplying electrical power to the vehicle including an electrical outlet to which the vehicle is brought and at which remains stationary for a period;
the vehicle comprising:
a vehicle power plant;
one or more electrical loads in the vehicle;
a CAN BUS communication system for communication between the vehicle power plant and said one or more electrical loads for controlling operation of the vehicle power plant;
the apparatus comprising:

an electrical connection cable for connection from the vehicle to the electrical outlet through which the electrical power is supplied which can be disconnected;

an outlet control unit mounted at the electrical outlet including a microprocessor;

a switch operable by the microprocessor of the outlet control unit for selectively supplying power from a central power supply to said electrical connection cable;

a vehicle control unit mounted in the vehicle including a microprocessor;

a power supply connection for supplying power from the electrical connection cable to said one or more loads in the vehicle;

wherein the microprocessor of the vehicle control unit is arranged to communicate data to the outlet control unit;

wherein the microprocessor of the vehicle control unit includes an interface which is arranged to connect to and communicate with said CAN BUS communication system of the vehicle;

and wherein the outlet control unit and the vehicle control unit are arranged to communicate from central source to said CAN BUS communication system to so as to download through said interface new data from the central source to the CAN BUS communication system, wherein the vehicle control unit and the CAN BUS communication system are arranged such that the CAN BUS communication system acts to prevent driving motion of the vehicle while the electrical connection cable remains connected.

* * * * *